(12) United States Patent
Schmidt

(10) Patent No.: US 9,156,115 B2
(45) Date of Patent: Oct. 13, 2015

(54) WORKPIECE RETENTION AND HANDLING SYSTEMS

(75) Inventor: Christoph Schmidt, Eberdingen/Hochdorf (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 798 days.

(21) Appl. No.: 13/329,726

(22) Filed: Dec. 19, 2011

(65) Prior Publication Data
US 2012/0153553 A1 Jun. 21, 2012

(30) Foreign Application Priority Data
Dec. 20, 2010 (DE) .................. 10 2010 063 541

(51) Int. Cl.
| | | |
|---|---|---|
| *B23Q 3/06* | (2006.01) | |
| *B21D 28/26* | (2006.01) | |
| *B23Q 7/04* | (2006.01) | |
| *B25B 5/06* | (2006.01) | |
| *B25B 5/08* | (2006.01) | |
| *B25B 5/16* | (2006.01) | |

(52) U.S. Cl.
CPC ............... *B23Q 3/06* (2013.01); *B21D 28/265* (2013.01); *B23Q 7/043* (2013.01); *B25B 5/061* (2013.01); *B25B 5/087* (2013.01); *B25B 5/16* (2013.01)

(58) Field of Classification Search
CPC .......... B25B 1/18; B25B 5/061; B25B 5/062; B23Q 3/08
USPC .................. 269/24, 27, 20, 228, 32
See application file for complete search history.

(56) References Cited

U.S. PATENT DOCUMENTS

| | | | | |
|---|---|---|---|---|
| 3,578,306 | A * | 5/1971 | Smith ............................. | 269/24 |
| 4,967,655 | A * | 11/1990 | Holderegger et al. ..... | 101/128.1 |
| 5,174,554 | A * | 12/1992 | Yonezawa ....................... | 269/24 |
| 5,181,700 | A * | 1/1993 | Yonezawa ....................... | 269/24 |
| 5,181,701 | A * | 1/1993 | Yonezawa ....................... | 269/32 |
| 5,752,693 | A * | 5/1998 | Brisco ............................. | 269/24 |
| 5,979,886 | A * | 11/1999 | Craft et al. ..................... | 269/24 |
| 6,948,708 | B2 * | 9/2005 | Moilanen et al. ............... | 269/32 |
| 7,673,860 | B2 * | 3/2010 | Ben-Gigi ........................ | 269/41 |
| 8,302,947 | B2 * | 11/2012 | Yonezawa et al. ............. | 269/32 |
| 2008/0237957 | A1 * | 10/2008 | Waldorf .......................... | 269/27 |
| 2010/0308521 | A1 * | 12/2010 | Yonezawa et al. ............. | 269/32 |
| 2012/0153553 | A1 * | 6/2012 | Schmidt ......................... | 269/27 |

FOREIGN PATENT DOCUMENTS

| | | |
|---|---|---|
| CN | 1282447 A | 1/2001 |
| CN | 1627992 A | 6/2005 |
| EP | 0493230 A1 | 7/1992 |
| JP | 57177973 A | 11/1982 |
| JP | 07185980 A | 7/1995 |
| JP | 08168836 A | 7/1996 |
| JP | 2000158068 A | 6/2000 |
| JP | 1282447 A | 1/2001 |
| JP | 1627992 A | 6/2005 |

* cited by examiner

*Primary Examiner* — Lee D Wilson
(74) *Attorney, Agent, or Firm* — Fish & Richardson P.C.

(57) ABSTRACT

In some aspects of the disclosure, a workpiece retention device for securing plate-like workpieces to a workpiece movement unit of a machine tool includes first and second workpiece clamping elements and a clamping drive by which the workpiece clamping elements can be moved towards one another starting from an initial relative position in order to clamp a workpiece that is arranged between the workpiece clamping elements. The workpiece retention device also includes an adjustment device that can adjust the initial relative position of the workpiece clamping elements.

24 Claims, 11 Drawing Sheets

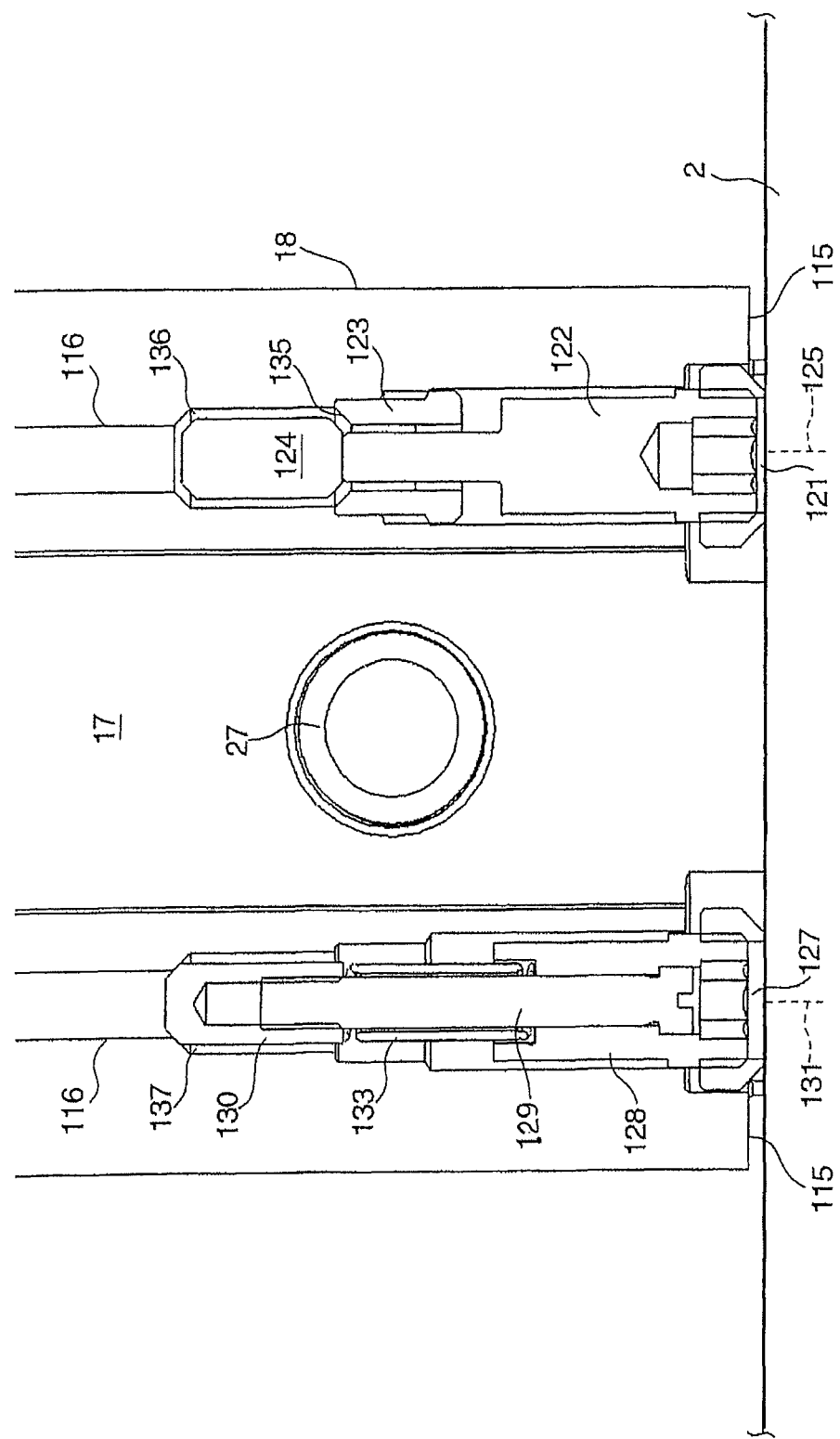

WORKPIECE RETENTION AND HANDLING SYSTEMS

CROSS REFERENCE TO RELATED APPLICATION

This application claims priority under 35 U.S.C. §119(a) to German Application No. 10 2010 063 541.3, filed on Dec. 20, 2010, the entire contents of which are hereby incorporated by reference in their entirety.

TECHNICAL FIELD

The invention relates to workpiece retention and handling systems.

BACKGROUND

JP 2000 158 068A discloses a workpiece retention device that serves to secure a metal sheet to a workpiece movement unit in the form of a coordinate guide of a turret punch press. To secure the metal sheet to the coordinate guide in a reliable manner, the coordinate guide includes two workpiece retention devices that are constructed in a substantially identical manner and each have a clamping drive in the form of a piston cylinder drive. Using the clamping drive, a workpiece clamping element can be moved towards another workpiece clamping element in order to clamp a workpiece that is arranged between the workpiece clamping elements. The clamping drive has a relatively long travel length so that both thick and thin workpieces can be clamped between the workpiece clamping elements. Furthermore, the clamping drive provides a sufficiently large clamping force to secure the clamped workpiece reliably between the workpiece clamping elements. Due to these requirements, the clamping drive is relatively large, particularly when it is constructed as a piston cylinder drive.

SUMMARY

In some aspects, a workpiece retention device includes an adjustment device by which an initial relative position of workpiece clamping elements can be adjusted. Typically, the initial relative position of the workpiece clamping elements can be adjusted based on a thickness of a workpiece to be clamped so that the clamping drive has to produce only a relatively short movement of the workpiece clamping elements towards each other in order to clamp workpieces having a wide range of different thicknesses between the workpiece clamping elements. Demands (e.g., structural demands) on the clamping drive are therefore reduced due to the adjustment device. As a result, the clamping drive can be constructed in a comparatively more compact manner.

In some embodiments, the initial relative position of the workpiece clamping elements can be adjusted using the adjustment device in such a manner that the workpiece clamping elements in an adjusted initial relative position abut a workpiece to be secured and apply a pretensioning force. As a result, the clamping drive can be constructed in a particularly compact manner. The clamping drive can typically move the workpiece clamping elements towards each other by only an amount at which the required clamping force can be produced. The clamping drive can typically compensate for the deformation produced in a drive train of the clamping drive due to the clamping force that is being produced.

In some embodiments, the initial relative position of the workpiece clamping elements can be adjusted using the adjustment device starting from a maximum opening position to accommodate a wide range of workpiece thicknesses. Workpieces having a wide range of thicknesses can be readily arranged between the workpiece clamping elements when the workpiece clamping elements are in the maximum opening position. Subsequently, once a workpiece is arranged between the workpiece clamping elements, the workpiece clamping elements can be transferred into the initial relative position using the adjustment device. In the case of very thin workpieces, the workpiece clamping elements are moved towards each other by a relatively large distance to arrange them in the initial relative position. The adjustment devices are typically constructed so that the workpiece clamping elements can be moved between their maximum opening position and a position in which the workpiece clamping elements can come into contact with each other when no workpiece is arranged between them. In some embodiments, the adjustment device includes an adjustment drive. The adjustment devices can be arranged in a drive train of the clamping drive between the clamping drive and a workpiece clamping element that can be moved by the clamping drive.

At least one of the workpiece clamping elements can typically be moved by the clamping drive via a pivotably supported redirection device. As a result of lever relationships created by the pivotably supported redirection device, a robust construction of the workpiece retention device can be produced in a simple manner. It can be advantageous, for structural reasons, for the adjustment device to be provided on the pivotably supported redirection device. The adjustment device and the redirection device can form a compact unit.

The adjustment of the initial relative position of the workpiece clamping elements is achieved by an initial pivoting of the pivotably supported redirection device using the adjustment device. The adjustment device can cooperate with a clamping-drive-side drive element in such a manner that the pivotably supported redirection device can be pivoted to different positions using the adjustment device. In accordance with the initial pivoting position of the redirection device adjusted in this manner, an initial relative position of the workpiece clamping elements is produced.

In some embodiments, the adjustment device has a displaceable wedge face that typically cooperates with the clamping-drive-side-drive element in order to adjust the initial relative position.

In some embodiments, a retraction drive is provided by which the workpiece clamping elements can be moved between an operating position and a retracted position relative to a housing of the workpiece retention device. Transferring the workpiece clamping elements at least temporarily into a retracted position allows the workpiece to be processed in a collision-free manner in the workpiece region that is located between the workpiece clamping elements or close to the workpiece clamping elements when the workpiece clamping elements are in the operating position. As a result, a dead region of the workpiece caused by the clamping elements is reduced. If multiple workpiece retention devices are provided, they can typically be moved independent of each other between the operating position and the retracted position using their respective retraction drives.

The adjustment drive, the clamping drive, and/or the retraction drive can be constructed, for example, as electromagnetic drives. The adjustment drive, the clamping drive, and the retraction drive can alternatively be constructed as piston cylinder drives in a simple, operationally secure and cost-effective manner. The piston cylinder drives are typically constructed as pneumatic piston cylinder drives to prevent certain environmental risks associated with the use of hydraulic oil as an operating fluid.

In some embodiments, the adjustment drive and the clamping drive are constructed as single-action piston cylinder drives for a simpler and more cost-effective construction. It is thus sufficient for an adjustment or a clamping movement of the workpiece clamping elements to be produced in one direction by acting on one side of at least one piston of the respective drive with an operating medium (e.g., compressed air). A subsequent return movement of the workpiece clamping elements can be caused by one or more restoring spring elements. However, the retraction drive is typically constructed as a dual-action piston cylinder drive.

In some embodiments, the adjustment device has a wedge face that is provided on a piston of a piston cylinder drive that forms the adjustment drive.

In some embodiments, the workpiece clamping elements are provided on clamping element retention members that are secured to a piston of a piston cylinder drive that forms the retraction drive.

In some embodiments, at least one of the workpiece clamping elements can be moved using the clamping drive via a wedge mechanism or a wedge gear mechanism. As a result, a robust gear mechanism is created that can be used to increase the clamping force produced between the workpiece clamping elements using the clamping drive.

Simple structural relationships can be produced when at least one workpiece clamping element is supported so as to be pivotable relative to another workpiece clamping element (e.g., between an opening position and a position in which the workpiece clamping elements abut a workpiece).

In a workpiece retention device with retractable workpiece clamping elements, there is the risk that the workpiece clamping elements may be unintentionally displaced from the operating position to the retracted position. In order to prevent the workpiece clamping elements from moving out of the operating position in this manner, in some embodiments, the workpiece retention device is constructed in such a manner that at least one workpiece clamping element is provided on a clamping element retention member and can be acted on by a pressure element that is driven by the clamping drive.

As long as the workpiece clamping elements are clamped against each other using a clamping force produced by the clamping drive, a frictional or positive-locking connection that temporarily secures the workpiece clamping elements in the operating position can be produced between the pressure element and the clamping element retention member. Such frictional or positive-locking connection can alleviate the need for additional separate fixing drives or similar devices that retain the workpiece clamping elements in the operating position. Alternatively or additionally, at least one locking element that is acted on resiliently can retain the workpiece clamping elements in the operating position.

In order to fix the workpiece clamping elements in the operating position, in some embodiments, a clamping element is provided on a clamping element retention member that can be pressed, due to the clamping force produced by the clamping drive, along an actuation axis against at least two inclined surface portions of a guiding face. Along the guiding face, the clamping element retention member can be moved along a retraction axis between the operating position and the retracted position. Since the surface portions, which are inclined relative to each other and against which the clamping element retention member is in abutment, are spaced apart from each other perpendicularly relative to the actuation axis and the retraction axis, the pressing force (e.g., the normal forces) acting perpendicularly relative to the surface portions are increased.

Since the sum of the normal forces is proportional to the frictional forces between the clamping element retention member and the guiding face, due to the increase in the normal force, the friction is also increased so that the clamping element retention member and consequently also the workpiece clamping elements are secured in a secure manner in the operating position.

In some embodiments, undesirable displacement of an adjustment component (e.g., a piston) that is provided with a wedge face is counteracted in a similar manner. This is achieved by the adjustment component being able to be pressed against at least two mutually inclined surface portions of a guiding face on which the adjustment component can be moved along an adjustment axis in order to change the initial relative position of the workpiece clamping elements. The adjustment component is pressed against the guiding face by a clamping-drive-side drive element moving along an actuation axis.

The surface portions are spaced apart from each other perpendicularly relative to the actuation axis and perpendicularly relative to the adjustment axis due to an aperture formed between the adjustment component and the guiding face. As a result, there is an increase in the friction between the adjustment component and the guiding face due to an increase in the normal forces between the adjustment component and the guiding face.

To help ensure operational reliability for the workpiece retention device, in some embodiments, control devices are used to help ensure that the adjustment drive can only be actuated when the workpiece clamping elements are arranged in the operating position and not when the workpiece clamping elements are arranged outside of the operating position. This can be carried out, for example, using a sensor that can detect whether the workpiece clamping elements are arranged in the operating position. Using such a sensor can result in a loss of processing time due to the control cycle related to operating the sensor.

In some embodiments, the time loss resulting from using the sensor can be prevented by using an operating medium system (e.g., a compressed air system) that has an outlet opening that is closed when the workpiece clamping elements are arranged in the operating position and which is open when the workpiece clamping elements are not arranged in the operating position. Using the operating medium system, the workpiece clamping elements can be moved towards each other using the adjustment drive in order to adjust the initial relative position only when the outlet opening is closed. The adjustment drive can be controlled based on the position of the workpiece clamping elements along the retraction axis.

With a pneumatically operated adjustment drive, compressed air which acts as an operating medium in the operating medium system can readily flow via the outlet opening into the ambient environment of the workpiece retention device. The control device typically is constructed in such a manner that the compressed air flows out only briefly.

In some embodiments, the adjustment drive can be controlled so that the retraction drive can be actuated only in order to transfer the workpiece clamping elements from the operating position into the retracted position when the workpiece clamping elements are open. To control the adjustment drive, an operating medium system for the retraction drive is provided with an outlet opening that is closed when the adjustment drive is in a position in which the workpiece clamping elements have maximum spacing from each other (e.g., the workpiece clamping elements are in an open position), and the outlet opening is open when the adjustment drive is in another position. Using pneumatic drive systems, the workpiece retention devices described herein can be controlled relatively simply compared to certain conventional workpiece retention devices.

For reasons of operational reliability, it can be advantageous for the clamping drive for tensioning the workpiece clamping elements to be able to be actuated only when the workpiece clamping elements are arranged in a predetermined initial relative position. This can be achieved by using a control device, via which an operating medium can be supplied to an operating cylinder of a piston cylinder drive that forms the clamping drive depending on the operating pressure in the operating cylinder of the piston cylinder drive that forms the adjustment drive. In this instance, a specific switching pressure is produced in the operating cylinder of the adjustment drive only when the workpiece clamping elements have been at least substantially transferred into the initial relative position. This can be achieved, for example, by the workpiece clamping elements being moved into an initial relative position in which they clamp the workpiece arranged between them with a pretensioning force that is determined by the operating pressure then present in the operating cylinder of the adjustment drive.

The control device typically has a valve which, when a maximum operating pressure is present in the operating cylinder of the adjustment drive, stops the flow of an operating medium supply to the operating cylinder of the clamping drive. The valve is constructed, for example, as a non-return valve with resilient biasing.

To help ensure that the workpiece to be clamped is arranged in the desired position between the workpiece clamping elements, the workpiece retention device has a workpiece stop that has at least one workpiece sensor. The at least one workpiece sensor determines whether the workpiece abuts the workpiece stop in the required manner during the workpiece processing operation.

Typically, at least one pneumatic work-piece sensor that has an associated compressed air conduit in which, depending on the state of the workpiece sensor, a pressure can build up that can be detected by a measurement device. For example, the workpiece sensor can be constructed in such a manner that the compressed air conduit at the workpiece sensor side is closed (i.e., allowing pressure to build up) if the workpiece correctly abuts the workpiece stop. The workpiece sensor is also constructed so that the compressed air conduit at the workpiece sensor side is open (i.e., so that pressure cannot build up) when the workpiece does not abut the workpiece stop.

In the case of a workpiece retention device with retractable workpiece clamping elements, in some embodiments, the compressed air conduit of the workpiece sensor is guided in such a manner that the compressed air conduit is closed (i.e., allowing pressure to build up) only when the workpiece clamping elements are arranged in their operating position, for example, a completely extended position.

The functionality of the workpiece sensor system is further increased if at least two workpiece sensors are provided.

While the workpiece sensors described are used on workpiece retention devices having an adjustment device for adjusting the initial relative position of workpiece clamping elements, they can be used with other types of workpiece retention devices.

The details of one or more embodiments of the invention are set forth in the accompanying drawings and the description below. Other aspects, features, and advantages of the invention will be apparent from the description and drawings, and from the claims.

DESCRIPTION OF DRAWINGS

FIGS. 10 to 12 are enlarged views of a workpiece stop region of the workpiece retention device of FIG. 8, illustrating a workpiece sensor in three different operational states.

DETAILED DESCRIPTION

Figure 1:
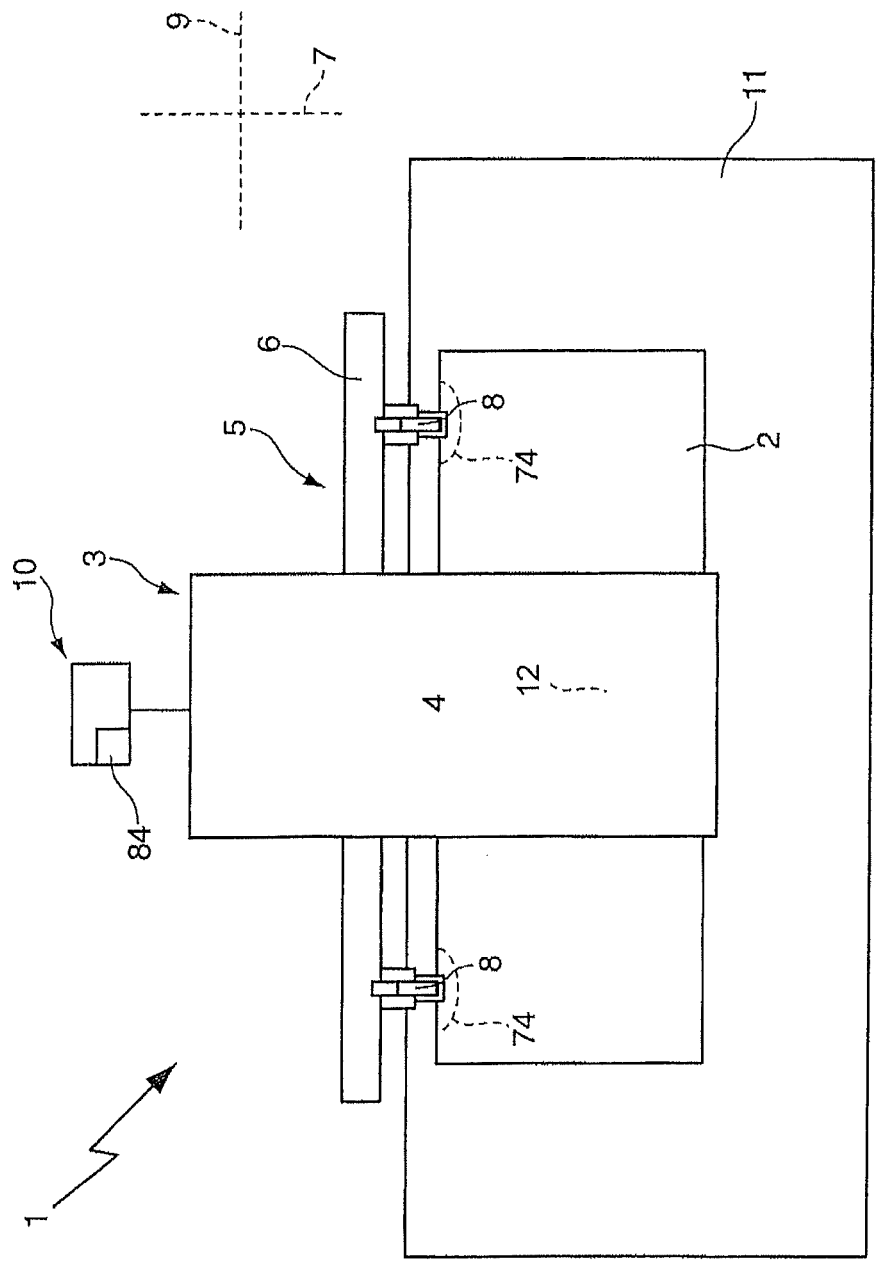
FIG. 1 is a schematic top view of a machine tool for processing sheet metal workpieces with a workpiece movement unit.

FIG. 1 is a top schematic view of a machine tool (e.g., a punching machine tool) 1 for processing plate-like workpieces (e.g., metal sheets) 2. The machine tool 1 has a C-shaped machine frame 3. An upper leg-portion 4 of the C-shaped machine frame 3 can be seen in FIG. 1. In the throat region of the C-shaped machine frame 3, a workpiece movement unit 5 is arranged. The workpiece movement unit 5 is constructed as a coordinate guide. A cross-member 6 of the workpiece movement unit 5 can move along a first movement axis 7 in a motor-driven manner. At least two workpiece retention devices 8 that are arranged on the cross-member 6 can be moved together on the cross-member 6 in a motor-driven manner along a second movement axis 9. The movement axes 7, 9 extend generally perpendicularly relative to each other and define a horizontal movement plane.

The workpiece 2 can be secured to the workpiece movement unit 5 using the workpiece retention devices 8 that are constructed as workpiece clamping lugs, and, while supported on a workpiece table 11, can be moved along the movement plane relative to a punching unit 12 of the machine tool 1. The drives of the machine tool 1 can be controlled using a numerical control unit 10.

FIGS. 2-5 are cross-sectional side views of one of the workpiece retention device 8 in four different operational states. The workpiece retention device 8 has two workpiece clamping elements. A first clamping element 13 is disposed at one end of a clamping element retention member in the form of a clamping arm 14. At the other, opposite end, the clamping arm 14 is pivotably supported about a pivot axis 16 by a bearing journal 15.

A second clamping element 17 is disposed at one end of a channel-like or spout-like clamping element retention member, which is also referred to herein as a claw spout 18. The claw spout 18 is securely connected to a guiding cylinder 19 at the end spaced away from the clamping element 17.

FIGS. 2-5 illustrate the claw spout 18 and the guiding cylinder 19 in a simplified manner. Briefly referring to FIG. 9, the claw spout 18 has been pushed into the guiding cylinder 19 and is secured to the base plate of the guiding cylinder 19 by fixing screws 24. The claw spout 18 and the guiding cylinder 19 can alternatively be constructed as one piece.

Referring again to FIGS. 2-5, the clamping arm 14 extends from the claw spout 18, with an end portion of the clamping arm 14 arranged into an inner hollow space of the claw spout 18. The bearing journal 15 of the clamping arm 14 extends through the clamping arm 14 perpendicularly relative to the plane of the cross-sectional view shown in FIGS. 2 to 5. Ends of the bearing journal 15 are arranged in recesses 20 of the claw spout 18 (shown in FIG. 9).

The base plate of the guiding cylinder 19 forms a piston 22 of a retraction drive 23. The piston 22 is constructed in one piece with the guiding cylinder 19 (shown in FIG. 9). The piston 22 can be moved back and forth in an operating cylinder 25 of the retraction drive 23 along a retraction axis 26.

A restoring spring element in the form of a helical spring 27 is arranged between the clamping arm 14 and the claw spout 18. The helical spring 27 is supported at one end in a recess on the clamping arm 14 and, at the other end, at the inner side of the claw spout 18.

Figure 2:
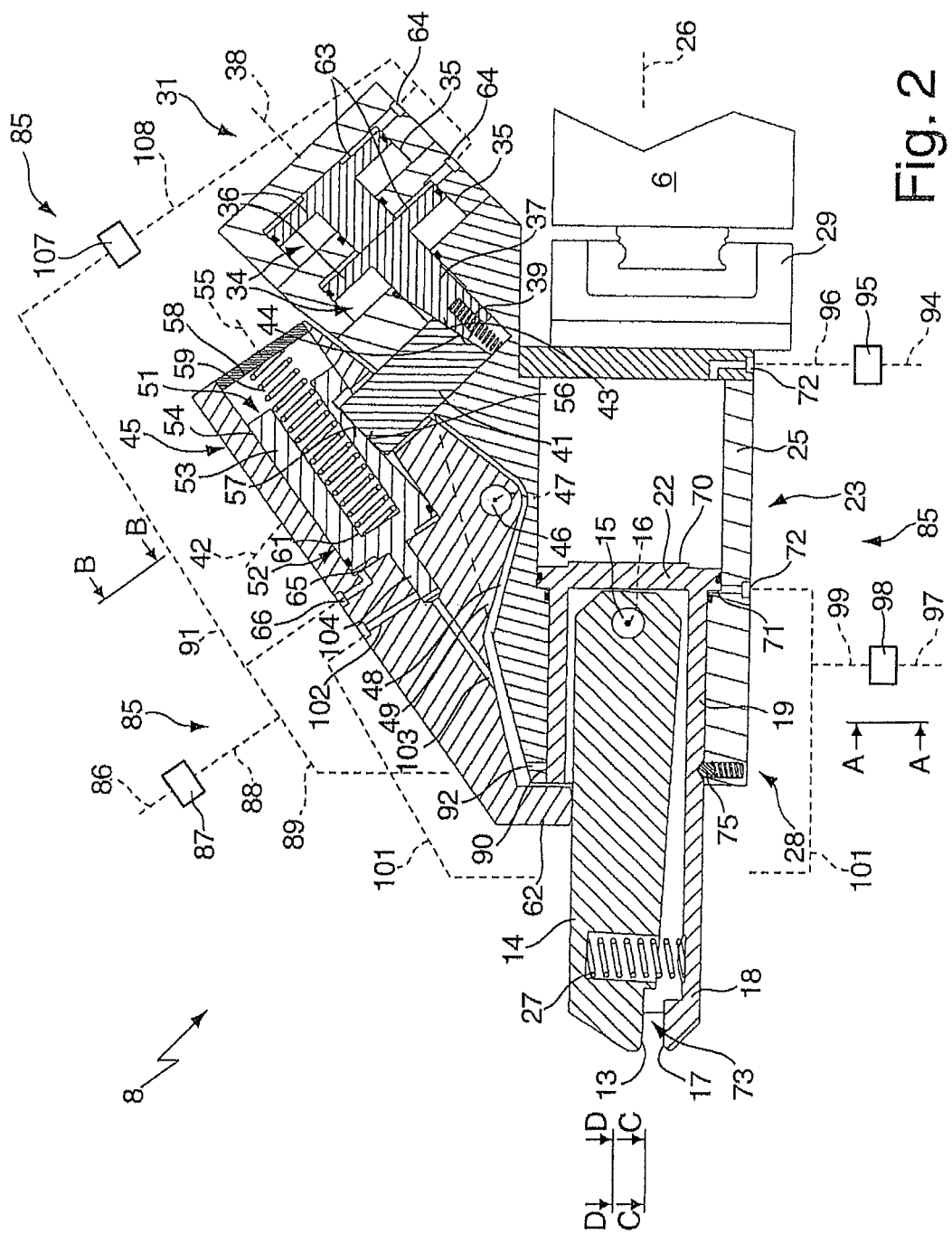
FIGS. 2 to 5 are cross-sectional side views of a workpiece retention device of the machine tool of FIG. 1 illustrating the workpiece retention device in four different operational states.

Referring to FIG. 2, the workpiece clamping elements 13, 17 protrude to the left with respect to an outer side (left side relative to the orientation shown in FIG. 2) of a housing 28 of the workpiece retention device 8. At an inner side (right side relative to the orientation shown in FIG. 2), the housing 28 is secured to a carrier rail 29 that can be displaced along the cross-member 6 of the workpiece movement unit 5 in the direction of the movement axis 9 (shown in FIG. 1).

At the upper side of the housing 28, a clamping drive 31 is arranged by which the workpiece clamping elements 13, 17 can be moved towards each other starting from an initial relative position in order to clamp a workpiece 2 arranged between the workpiece clamping elements 13, 17. There are also additional adjustment devices 51 by which the initial relative position of the workpiece clamping elements 13, 17 can be adjusted.

The clamping drive 31 includes a piston cylinder drive with two piston cylinder units 34 that are arranged one on top of the other and each have an operating cylinder 35 and a piston 36. Alternatively, a piston cylinder drive can include only one piston cylinder unit or more than two piston cylinder units. A first drive element 37 is connected to the piston 36 of the clamping drive 31 and can be moved back and forth along a clamping drive axis 38 by the clamping drive 31. The first drive element 37 is supported on the base of a recess of the housing 28 by a restoring spring element in the form of a helical spring 39.

A second drive element (e.g., a clamping-drive-side drive element) 41 is supported in the housing 28 so as to be able to be displaced along a displacement axis 42 that extends substantially perpendicularly relative to the clamping drive axis 38. The second drive element 41 has a wedge face 43 along an end face that cooperates with a parallel wedge face 44 at a lateral longitudinal face of the first drive element 37. The wedge faces 43, 44 extend at an acute angle relative to the clamping drive axis 38. A wedge mechanism or wedge gear mechanism is produced with a transmission by which a drive force of the clamping drive 31 can be converted into a clamping force that is greater (e.g., significantly greater) than a force produced without the transmission and acts at the workpiece clamping elements 13, 17.

An end of the second drive element 41 that is away from the first drive element 37 protrudes beyond the housing 28 of the workpiece retention device 8. The second drive element 41 protrudes into a redirection device 45 that is supported by a bearing journal 46 at an upper side of the housing 28 about a horizontal pivot axis 47 that extends parallel to the pivot axis 16 of the pivot arm 14. In order to support the bearing journal 46, the housing 28 has a recess 48 in which a corresponding protrusion 49 of the redirection device 45 is arranged. The ends of the bearing journal 46 are supported by side walls of the recess 48 opposing the pivot axis 47.

The adjustment device 51 for adjusting an initial relative position of the workpiece clamping elements 13, 17 is arranged in the redirection device 45 in a space-saving manner. The adjustment device 51 has an adjustment drive 52 in the form of a piston cylinder drive. The piston 53 of the adjustment drive 52 can be moved in an operating cylinder 54 along an adjustment drive axis 55. A peripheral face of the cylindrical piston 53 has a recess along which a wedge face 56 is formed and against which a curved end face 57 of the second drive element 41 abuts. The piston 53 consequently forms an adjustment component which is provided with the wedge face 56 and which can be adjusted along an adjustment axis that coincides with the adjustment drive axis 55.

The piston-side wedge face 56 extends at an angle (e.g., 90±2°) relative to the displacement axis 42 of the second drive element 41. In the example shown in FIG. 2, the piston-side wedge face 56 extends at an angle of 88.5° with respect to the displacement axis 42 of the second drive element 41. A restoring spring element in the form of a helical spring 59 is arranged between the piston 53 of the adjustment drive 52 and a base 58 of the operating cylinder 54 of the adjustment drive 52. A piston-side end of the helical spring 59 is arranged in an axial recess 61 on the piston 53.

The redirection device 45 acts on the clamping arm 14 using a pressure element 62 which abuts the upper side of the clamping arm 14.

Both the clamping drive 31 and the adjustment drive 52 are constructed as single-action piston cylinder drives. That is to say, an operating medium, such as compressed air (e.g., compressed air at an air pressure of about 6 bar) acts only on one side of the pistons 36, 53. In the case of the clamping drive 31, the operating medium can be supplied via supply lines 64 and act only on piston faces 63 of the pistons 36. Compressed air (e.g., compressed air at an air pressure of about 6 bar) is typically used as an operating medium for the clamping drive 31.

In the case of the adjustment drive 52, the operating medium can be supplied via a supply line 66 and act only on a piston face 65 of the piston 53. In contrast to the clamping drive 31 and the adjustment drive 52, the retraction drive 23 is constructed as a dual-action piston cylinder drive. The operating medium can be supplied via separate supply lines 72 and can act on both a piston face 70 and an annular piston face 71 of the piston 22.

The operating method of the workpiece retention device 8 is described in detail below with reference to the various operational states of the workpiece retention device 8 illustrated in FIGS. 2 to 5.

In FIG. 2, the workpiece retention device 8 is illustrated in an open position, in which the workpiece clamping elements 13, 17 are arranged in a maximum opening position relative to each other. In the maximum opening position, the pistons 36 of the clamping drive 31 are arranged in an upper end position in which they are pushed fully to the right in an upward direction (relative to the orientation shown in FIG. 2). With the pistons 36 are arranged in this upper end position, the workpiece clamping elements 13, 17 are arranged in an initial relative position with respect to the clamping drive 31.

The adjustment drive 52 shown in FIG. 2 is also arranged in an end position. The piston 53 of the adjustment drive 52 is pushed fully to the left in a downward direction (relative to the orientation shown in FIG. 2). The redirection device 45 is arranged in an initial pivoting position, starting from which it can be pivoted relative to the housing 28 of the workpiece retention device 8 in a counter-clockwise direction about the pivot axis 47.

With the workpiece clamping elements 13, 17 completely open (shown in FIG. 2), an edge of a workpiece 2 to be secured by the workpiece retention device 8 is introduced between the workpiece clamping elements 13, 17 until it abuts a workpiece stop 73 constructed on the claw spout 18. The workpiece stop 73 is provided with two workpiece sensors whose construction and operating method are discussed below with reference to FIGS. 8-12.

Figure 3:
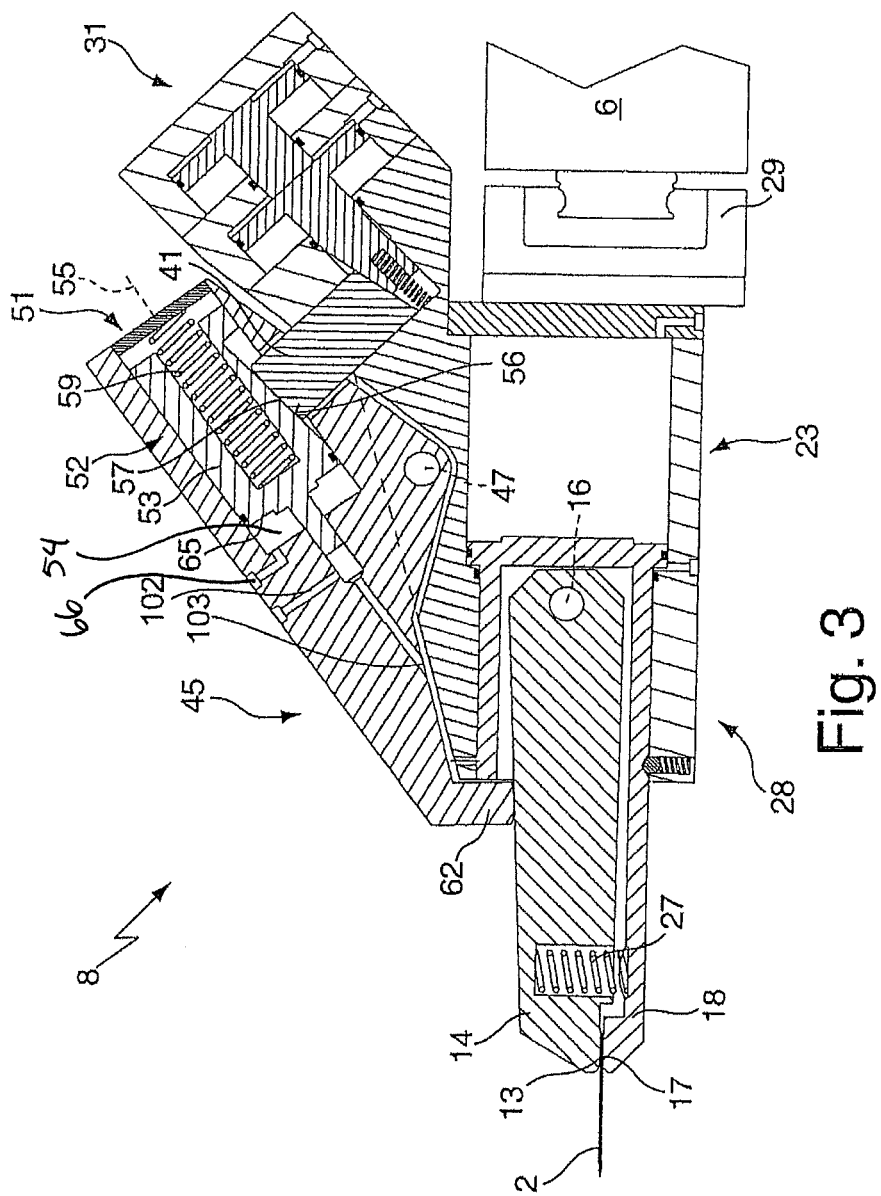

After the edge of the workpiece 2 has been arranged between the workpiece clamping elements 13, 17, the initial relative position of the workpiece clamping elements 13, 17 is adjusted using the adjustment drive 52 such that the workpiece clamping elements 13, 17 abut opposing sides of the workpiece 2 to apply a pretensioning force (shown in FIG. 3).

Referring to FIG. 3, the adjustment or closure movement of the work-piece clamping elements 13, 17 is carried out by compressed air being supplied to the operating cylinder 54 of the adjustment drive 52 via the supply line 66. As compressed air enters the operating cylinder 54, the piston 53 is subsequently displaced towards the right, upward direction (relative to the view shown in FIG. 2) along the adjustment drive axis 55, which compresses the helical spring 59. As a result, the wedge face 56 of the piston 53 moves along the curved end face 57 of the second drive element 41. Due to the inclination of the wedge face 56 with respect to the adjustment drive axis 55, the redirection device 45 is pivoted in a counter-clockwise direction (relative to the view shown in FIG. 2) about the pivot axis 47. The curved shape of the end face 57 helps to permit sliding and tilting of the end face 57 with respect to the wedge face 56.

Due to the pivot movement of the redirection device 45 and a force provided by the pressure element 62, the pivot arm 14 is also pivoted in a counter-clockwise direction (relative to the view shown in FIG. 2) about the pivot axis 16. As a result, the clamping element 13 of the clamping arm 14 is moved towards the lower clamping element 17 and the helical spring 27 becomes increasingly compressed.

The adjustment movement is continued until, due to the restoring forces of the helical springs 27, 59 and the pretensioning force by which the workpiece clamping elements 13, 17 clamp the workpiece 2, a counter-force that corresponds to the drive force of the adjustment drive 52 is produced. When the adjustment movement stops, the redirection device 45 achieves a predetermined initial pivot position and the workpiece clamping elements 13, 17 achieve a predetermined initial relative position. In these initial positions, the workpiece 2 is not yet clamped between the workpiece clamping elements 13, 17 in a sufficiently secure manner to reliably prevent the workpiece 2 from sliding out during fast or forceful movements caused by the workpiece movement unit 5.

In order to clamp the workpiece 2 with sufficient clamping force between the workpiece clamping elements 13, 17, the clamping drive 31 can move the workpiece clamping elements 13, 17 towards each other starting from the initial relative position (shown in FIG. 3). Since the workpiece clamping elements 13, 17 clamp the workpiece 2 with a pretensioning force in the initial relative position adjusted by the adjustment drive 52, the workpiece clamping elements 13, 17 only have to be moved towards each other by a relatively small distance. The distance is typically determined by the material properties (e.g., the strength and stiffness) of the workpiece 2 and can be, for example, only a few μm.

Figure 4:
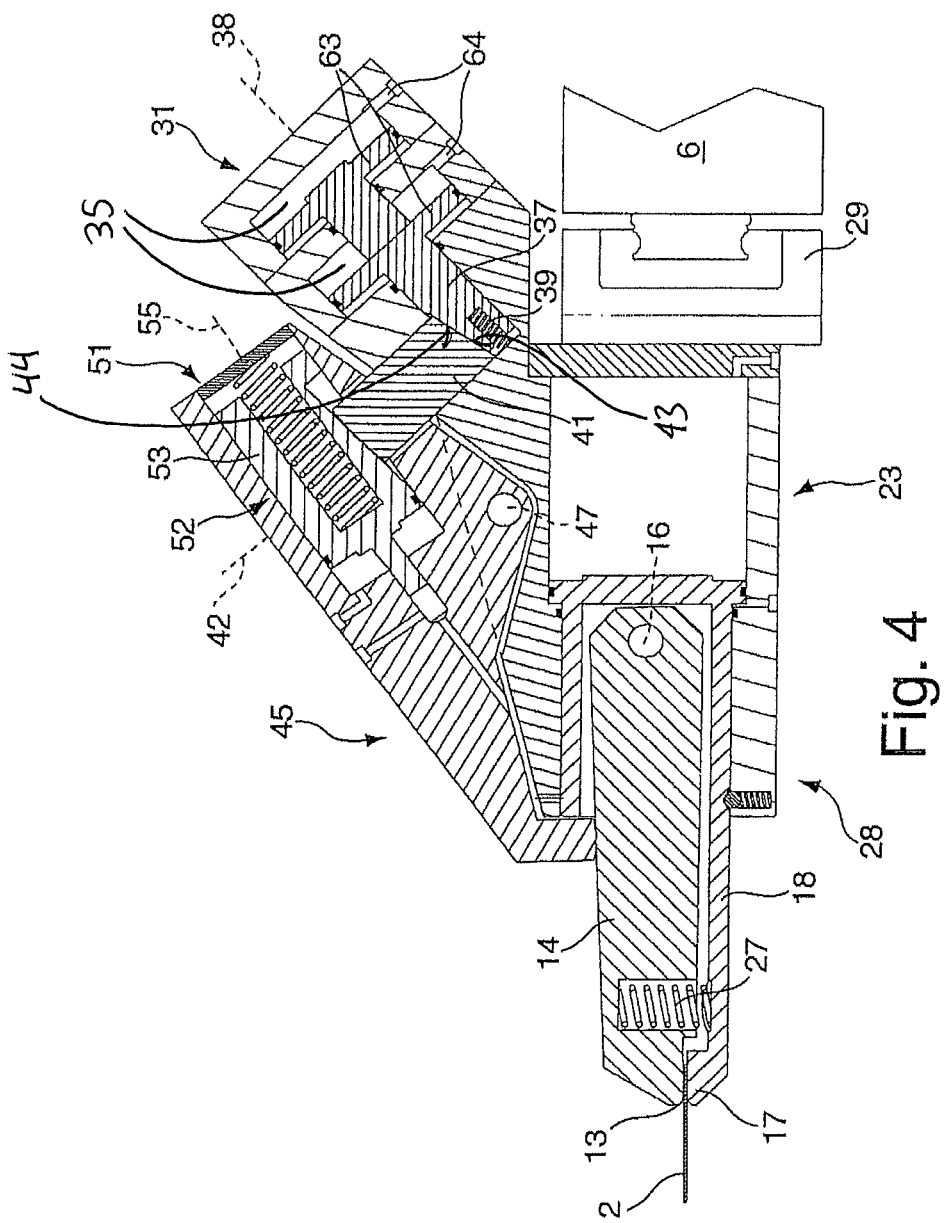

Referring now to FIG. 4, for clamping the workpiece 2, the operating cylinders 35 of the clamping drive 31 are acted on with compressed air so that the first drive element 37 is moved toward a left, downward direction (relative to the view shown in FIG. 3) along the clamping drive axis 38 to compress the helical spring 39.

Due to the displacement of the first drive element 37, the second drive element 41 is moved toward a left, upward direction (relative to the view shown in FIG. 3) along the displacement axis 42 towards the piston 53 of the adjustment drive 52. As a result, the redirection device 45 is pivoted further in a counter-clockwise direction (relative to the view shown in FIG. 3) until the configuration shown in FIG. 4 is achieved. The workpiece 2 is now clamped with a higher clamping force (e.g., higher than the pretensioning force) between the workpiece clamping elements 13, 17. Due to the cooperation of the wedge faces 43, 44 and the lever relationships between the redirection device 45 and the clamping arm 14, a relatively high clamping force can be produced between the workpiece clamping elements 13, 17 using the clamping drive 31.

Figure 5:
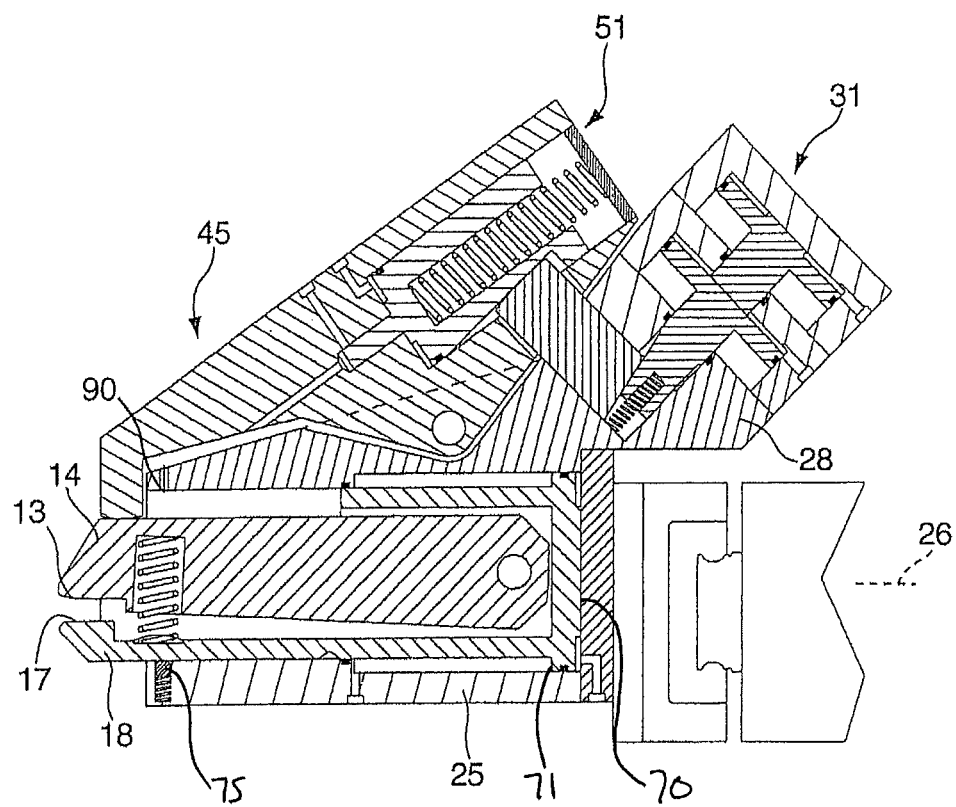

So that the workpiece 2 can also be processed by the punching unit 12 in the local region (e.g., the clamping region) 74 (shown FIG. 1) of the workpiece retention device 8, the workpiece retention device 8 is provided with the retraction drive 23. As shown in FIG. 5, using the retraction drive 23, the clamping arm 14, and the claw spout 18 together with the workpiece clamping elements 13, 17 can be moved along the retraction axis 26 from the operating position to a retracted position. In the retracted position, the clamping arm 14 and the claw spout 18 are arranged in a space-saving manner at least partially in the operating cylinder 25 of the retraction drive 23.

So that the workpiece 2 is properly secured to the workpiece movement unit 5 when the workpiece clamping elements 13, 17 of a workpiece retention device 8 are retracted, the machine tool 1 typically has three or more workpiece retention devices 8 so that the workpiece 2 can typically always be retained by at least two workpiece retention devices 8.

As shown in FIGS. 2-5, the piston face 70 is relatively large (e.g., compared to the piston face 71 for the opposing retraction movement). This helps to prevent the workpiece clamping elements 13, 17 from inadvertently being displaced towards the retracted position from the operating position due to a larger force that is created on the piston face 70 than a force created on the piston face 71 when compressed air acts on the piston faces 70, 71.

Due to the relatively small piston face 71, the volume of compressed air that is introduced into the operating cylinder 25 of the retraction drive 23 for the retraction movement can be relatively small. Consequently, the workpiece clamping elements 13, 17, despite a relatively small connection cross-sectional area of the supply line 72, etc., can be moved at high speeds into the retracted position.

A locking ball 75, which is acted on by a spring that forces the locking ball 75 against the claw spout 18 and can engage a notch at the lower side of the claw spout 18 when the workpiece clamping elements 13, 17 are in the operating position, also helps to prevent the workpiece clamping elements 13, 17 from being inadvertently moved from the operating position to the retracted position.

When no workpiece 2 is clamped by the workpiece retention device 8, the workpiece clamping elements 13, 17 are arranged in the operating position by the locking ball 75 and by force applied to the piston face 70 of the piston 22 by compressed air pressure. This force helps keep the workpiece clamping elements 13, 17 in place when the workpiece 2 is placed in the workpiece retention device 8.

When a workpiece 2 is clamped by the workpiece retention device 8 (shown in FIG. 4), the workpiece clamping elements 13, 17 are additionally inhibited from moving towards the retracted position by a frictional engagement between the pressure element 62 and the upper surface of the clamping arm 14.

Additionally, due to the configuration of the lower side of the claw spout 18, a frictional force between the claw spout 18 and a guiding face 76 of the housing 28 of the workpiece retention device 8 is increased. In this manner, undesirable slipping of the claw spout 18 from the operating position is additionally counteracted when a workpiece 2 is clamped between the workpiece clamping elements 13, 17.

Figure 6:
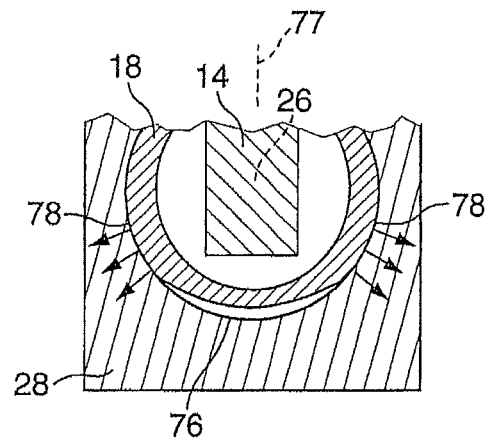
FIGS. 6 and 7 are cross-sectional views of the workpiece retention device of FIG. 2 along section A-A and section B-B in FIG. 2, respectively.

FIG. 6 is a cross-sectional view along the plane A-A indicated in FIG. 2, illustrating the clamping arm 14, the claw spout 18, and the housing 28. With the workpiece clamping elements 13, 17 in the clamped state, the claw spout 18 is pressed downward along an actuation axis 77 onto the guiding face 76 of the housing 28. As a result, the claw spout 18 acts on two inclined surface portions 78 of the guiding face 76. The claw spout 18 is consequently not pressed onto a surface portion that extends perpendicularly relative to the actuation axis 77. Due to a central aperture, the surface portions 78 onto which the claw spout 18 is pressed are spaced apart from each other transversely relative to the actuation axis 77 and transversely relative to the retraction axis 26.

FIG. 6 illustrates with arrows the components of the downward force by which the claw spout 18 is pressed onto the guiding face 76. The force components (e.g., normal forces) that extend at an angle relative to the actuation axis 77 are greater in magnitude than the actuation force of the retraction drive 23. Since the frictional forces between the claw spout 18 and the guiding face 76 is dependent on the normal forces, the frictional forces between the claw spout 18 and the guiding face 76 are increased by increases in the normal force. With the workpiece clamping elements 13, 17 clamped, increased frictional forces help to prevent the claw spout 18 and the workpiece clamping elements 13, 17 from moving from the operating position into the retracted position.

Figure 7:
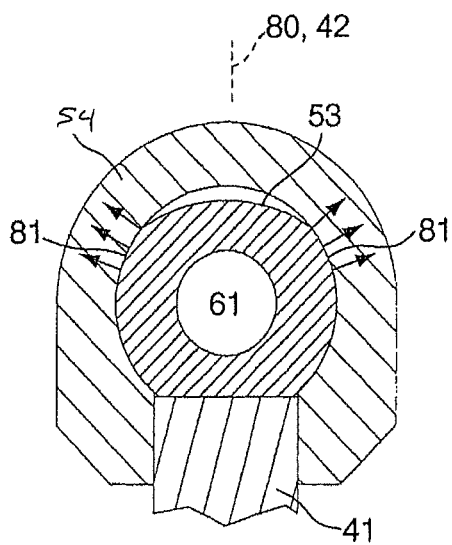

In a similar manner, undesirable movement of the piston 53 of the adjustment drive 52 can be prevented. A sliding guide is produced inside the operating cylinder 54 of the adjustment drive 52 in order to produce a high level of friction against the piston 53 when the workpiece retention device 8 is in the clamped state. FIG. 7 illustrates a cross-sectional view of the piston 53, the operating cylinder 54, and an end portion of the second drive element 41 along section B-B of FIG. 2. When the workpiece clamping elements 13, 17 clamp a workpiece 2 with a clamping force, the second drive element 41 acts on the piston 53 along an actuation axis 80 that coincides with the displacement axis 42 of the second drive element 41. Due to the forces caused by the second drive element 41, the piston 53 is pressed upwards onto two surface portions 81 of the inner side of the operating cylinder 54 of the adjustment drive 52. The inner surface of the operating cylinder 54 forms a guiding face for the piston 53 along the adjustment drive axis 55.

Similar to the mechanical arrangement at the lower region of the claw spout 18, due to a central aperture between the piston 53 and the inner surface of the operating cylinder 54, the normal forces with which the piston 53 abuts the inner side of the operating cylinder 54 can be increased. The normal forces are illustrated in FIG. 7 as arrows. The increase in normal forces results in an increase in the frictional forces by which undesirable movement of the piston 53 can be prevented.

Furthermore, the inclination of the wedge face 56 on the piston 53 is selected in such a manner that the piston 53 can be self-locking in the operating cylinder 54.

In order to control the workpiece retention device 8, a control module 84 (shown in FIG. 1) that is part of the numerical control unit 10 of the machine tool 1 is used. Using the control module 84, compressed air systems 85 can be controlled in order to supply or discharge compressed air from the drives 23, 31, 52 of the workpiece retention device 8. Typically, the compressed air systems 85 have various compressed air lines and control devices controlled by the control module 84 in the form of valves that are at least partially accommodated in the housing 28 of the workpiece retention device 8. Portions of the compressed air systems 85, including air lines, are schematically illustrated in FIG. 2.

The compressed air system 85 for the adjustment drive 52 has a compressed air supply line 86 in which compressed air of approximately 6 bar is delivered. The compressed air supply line 86 is connected by a flow valve 87, which can be controlled by the control module 84, to a compressed air line 88 that is connected to the operating cylinder 54 of the adjustment drive 52. A second compressed air line 89 branches from the compressed air line 88 and is connected to an outlet opening 90. A third compressed air line 91 also branches from the first compressed air line 88 whose function is discussed below.

The outlet opening 90 is connected to the compressed air line 89 by a compressed air conduit 92 that is formed by a hole in the housing 28 of the workpiece retention device 8. If the workpiece clamping elements 13, 17 are arranged in the operating position (shown in FIG. 2), the outlet opening 90 is closed by the guiding cylinder 19 of the claw spout 18. If the workpiece clamping elements 13, 17 are arranged outside the operating position (shown in FIG. 5), the outlet opening 90 is open with respect to the environment of the workpiece retention device 8 and the compressed air in the compressed air lines 88, 89, 91 can be discharged.

Due to this arrangement, the piston 53 of the adjustment drive 52 can be prevented from being actuated when the workpiece clamping elements 13, 17 are not arranged in the operating position along the retraction axis 26. As a result, the flow valve 87 can remain open during an ejection movement of the workpiece clamping elements 13, 17 without the adjustment drive 52 prematurely becoming operable. The outlet opening 90 is only closed by the guiding cylinder 19 and pressure can build up in the operating cylinder 54 of the adjustment drive 52 so that the piston 53 can be displaced when the workpiece clamping elements 13, 17 have reached the operating position.

The compressed air system 85 for the retraction drive 23 includes a compressed air supply line 94, a flow valve 95, and a compressed air line 96 that are connected to the portion of the operating cylinder 25 associated with the large piston face 70. An additional compressed air supply line 97, an additional flow valve 98, and an additional compressed air line 99 are connected to the other portion of the operating cylinder 25. At both compressed air supply lines 94, 97, compressed air is supplied at about 6 bar.

A second compressed air line 101 branches from the compressed air line 99 and into a compressed air conduit 102 that is formed by a hole on the redirection device 45. The compressed air conduit 102 is guided via a lower cylinder space of the operating cylinder 54 of the adjustment drive 52 to an outlet opening 103. The lower cylinder space is sealed from the remaining inner space of the operating cylinder 54 by a cylindrical continuation or extension 104 of the piston 53.

If the piston 53 is arranged in the lower end position (shown in FIG. 2), the continuation 104 closes the compressed air conduit 102 towards the outlet opening 103. If the piston 53 assumes a different position along the adjustment drive axis 55 (shown FIG. 3), the compressed air conduit 102 or the outlet opening 103 is open so that compressed air can be discharged from the compressed air lines 99, 101 into the ambient environment of the workpiece retention device 8. Therefore, the annular piston face 71 of the piston 22 of the retraction drive 23 can only be acted on with compressed air (i.e., the workpiece clamping elements can only be moved to the retracted position) when the adjustment drive 52 is arranged as shown in FIG. 2 and the workpiece clamping elements 13, 17 are opened to the maximum extent with respect to the adjustment drive 52.

Due to this arrangement, the flow valve 98 can remain open during the opening of the workpiece clamping elements 13, 17 without the retraction drive 23 inadvertently operating. The locking ball 75 which is acted on by a spring also prevents the workpiece clamping elements 13, 17 from being prematurely moved to the retracted position by residual pressure that may exist in spite of the opened outlet opening 103.

The compressed air system 85 for the clamping drive 31 includes a flow valve 107 and compressed air lines 108 that are connected to the operating cylinder 35 of the clamping drive 31. The compressed air system 85 for the clamping drive 31 is supplied with compressed air via the branched compressed air line 91 that is connected to the flow valve 107.

The flow valve 107 is open or closed depending on the pressure in the operating cylinder 54 of the adjustment drive 52. The flow valve 107 is constructed as a non-return style valve combination with resilient pretensioning. Using the compressed air line 91, the pressure in the operating cylinder 54 of the adjustment drive 52 is accessed and supplied to the flow valve 107. The flow valve 107 is adjusted so that it is open only when a switching pressure in the operating cylinder 54 of the adjustment drive 52 reaches at least 4 bar, which typically only occurs when the workpiece clamping elements 13, 17 abut the workpiece 2 and clamp it with a specific pre-tensioning force. In this manner, the clamping drive 31 can typically only be actuated after the adjustment drive 52 has positioned the workpiece clamping elements 13, 17 on the workpiece 2.

The compressed air systems 85 of the workpiece retention device 8 typically have a high level of operational reliability and are capable of short switching times. The compressed air systems 85 have additional devices for rapidly discharging compressed air from the operating cylinders 25, 35, 54 in order to be able to initiate respective reverse travel. For example, the operating cylinders 25, 35, 54 can include rapid venting valves for rapidly discharging compressed air.

Figure 8:
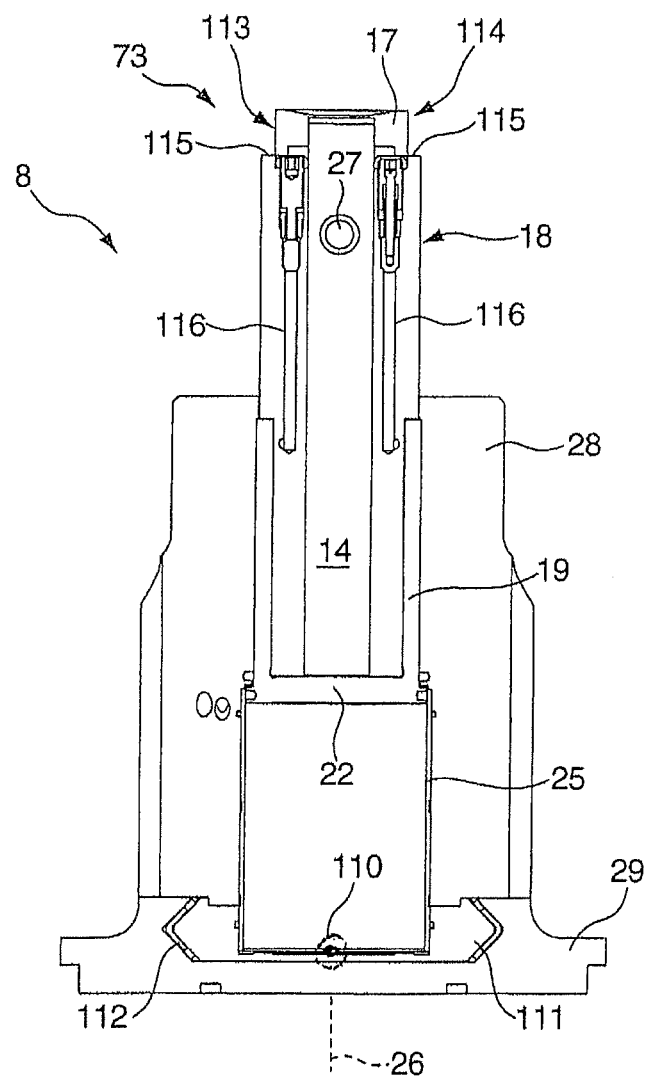
FIGS. 8 and 9 are cross-sectional views of the workpiece retention device of FIG. 2 along section C-C and section D-D in FIG. 2, respectively.

FIG. 8 is a cross-sectional view of the workpiece retention device 8 along a horizontal plane of section C-C indicated in FIG. 2. In contrast to FIG. 2, the workpiece clamping elements 13, 17 are closed in FIG. 8. As shown, the workpiece retention device 8 is guided on the carrier rail 29 of the workpiece movement unit 5 to move along a vertical displacement axis 110 that extends into the view shown in FIG. 8. For moving the workpiece retention device 8, a carriage 111, to which the housing 28 of the workpiece retention device 8 is secured, is arranged in a roller guide 112 on the carrier rail 29. Starting from an idle position, the entire workpiece retention device 8 can be moved vertically along the displacement axis 110.

For example, the workpiece retention device 8 can be moved upwards by a distance corresponding to a deformation being formed in the clamped workpiece 2 in the region of the workpiece retention device 8. The restoring movement of the workpiece retention device 8 into the rest position can be carried out purely by the action of gravitational force or, for example, using a pneumatic drive.

As shown in FIG. 8, the workpiece retention device 8 has a workpiece stop 73 that has two workpiece sensors 113 and 114. The workpiece stop 73 is arranged on the claw spout 18 and delimits the workpiece clamping element 17 formed by the spout end. The workpiece stop 73 has two vertical stop faces 115 between which the front end of the clamping arm 14 is arranged. Each of the workpiece sensors 113, 114 is disposed in one of the respective stop faces 115.

Compressed air conduits 116 formed by holes are directed to the workpiece sensors 113, 114. The paths of the compressed air conduits 116 within the workpiece retention device 8 are shown in greater detail in FIG. 9 which is a cross-sectional illustration of the workpiece retention device 8 along section D-D in FIG. 2. The portions of the compressed air conduits 116 illustrated with dashed lines in FIG. 9 extend above or below the plane of section illustrated in FIG. 9.

Figure 9:
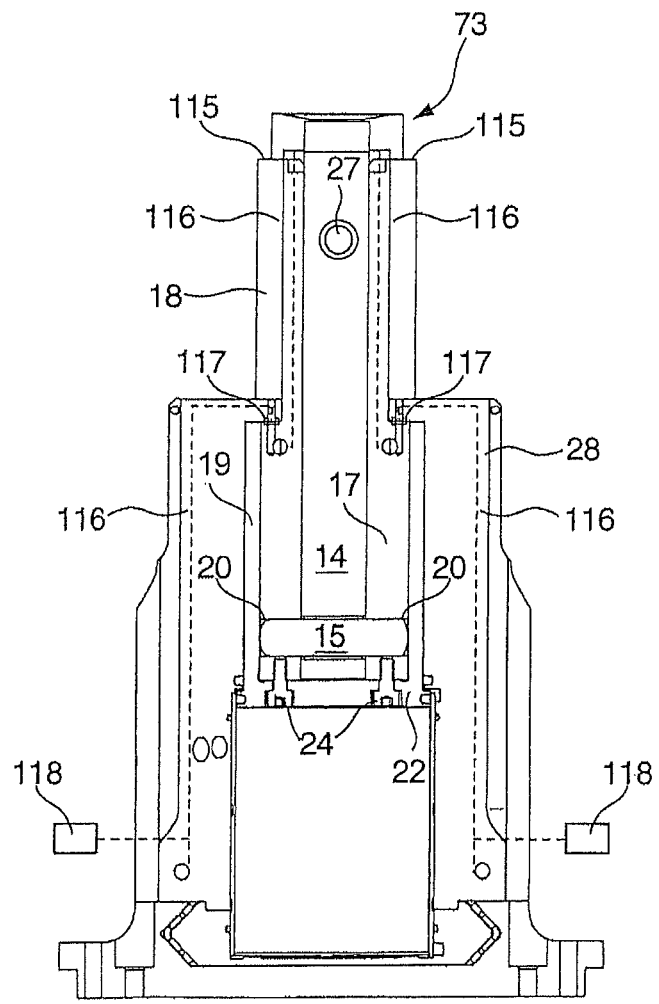

The portions of the compressed air conduits 116 that extend within the claw spout 18 open at one end to the workpiece sensors 113, 114 and open at the other end to abutment faces 117 along which the claw spout 18 abuts the housing 28 when the workpiece clamping elements 13, 17, as illustrated in FIG. 9, are arranged in their operating position. From the abutment faces 117, the compressed air conduits 116 continue into the housing 28. When the workpiece clamping elements 13, 17 are not arranged in the operating position, the compressed air lines 116 are consequently open at the transition between the claw spout 18 and housing 28.

The workpiece retention device 8 includes two measuring devices 118 by which the pressure in the compressed air conduits 116 can be measured.

The construction of the workpiece sensors 113, 114 is discussed below with reference to FIGS. 10 to 12 in which an enlarged view of FIG. 8 is illustrated in three different sensor operational states. The clamping arm 14 is not illustrated in FIGS. 10 to 12 so that the spout end of the claw spout 18 can be seen more easily. The spout end has a central workpiece abutment face and lateral inclined starting portions.

Figure 10:
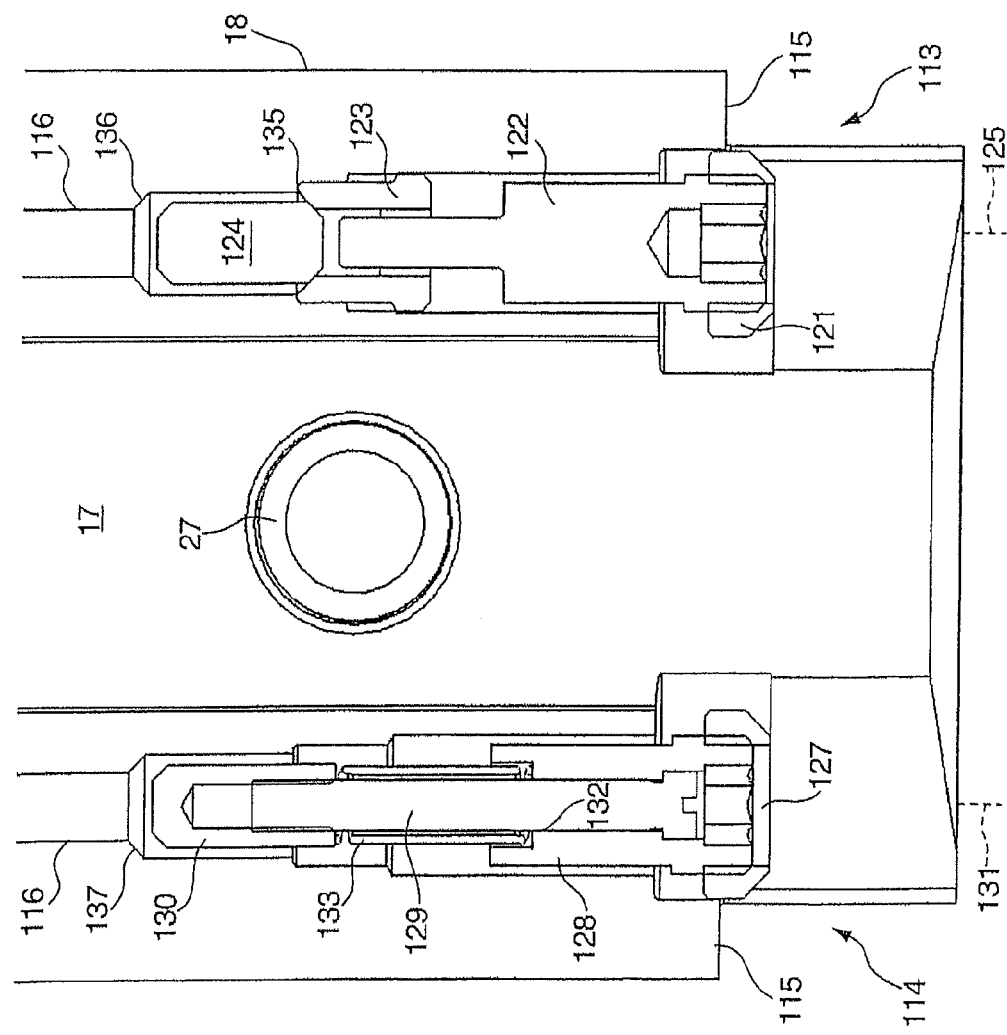
Figure 11:
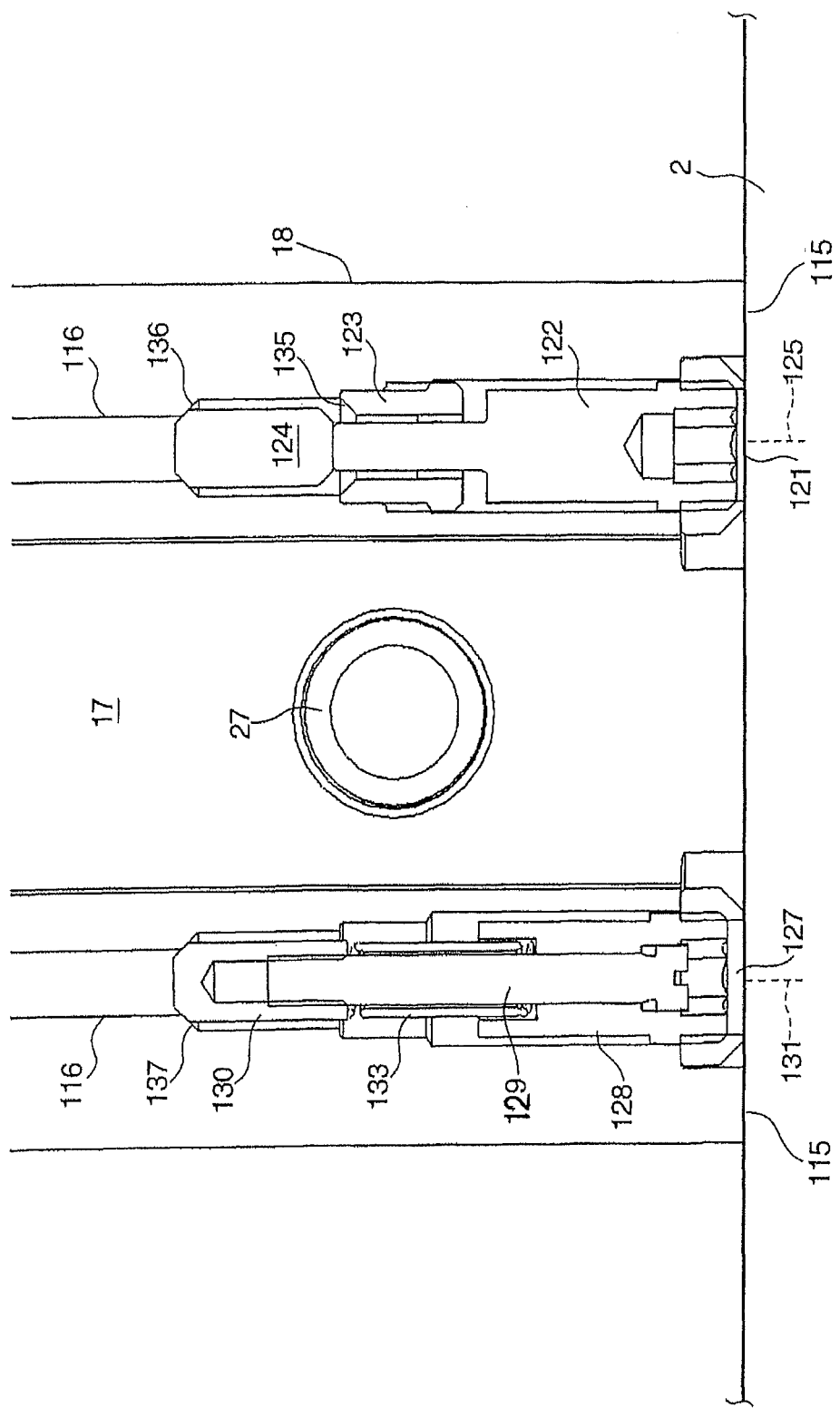

Referring to FIGS. 10-12, the workpiece sensors 113, 114 are constructed differently. The workpiece sensor 113 (arranged at the right-hand side in FIG. 10) includes a workpiece abutment element 121, a control tappet 122, a screw insert 123 and a control cam 124. The workpiece abutment element 121 is secured to the control tappet 122. Together with the control tappet 122, the workpiece abutment element 121 can be moved along the longitudinal axis 125 of the end portion of the compressed air conduit 116 between the positions illustrated in FIGS. 10 and 11. In the configuration shown in FIG. 10, the workpiece abutment element 121 protrudes with respect to the stop face 115 and, in the configuration shown in FIG. 11, the front side of the workpiece abutment element 121 is in alignment with the stop face 115.

The screw insert 123 is securely screwed into the compressed air conduit 116. The control cam 124 can be moved within the compressed air conduit 116 along the longitudinal axis 125 between two positions which can also be seen in FIGS. 10 and 11.

The workpiece sensor 114 (illustrated at the left-hand side in FIG. 10) includes a workpiece abutment element 127, an abutment element retention member 128, a control tappet 129, and a control cam 130. The workpiece abutment element 127 is securely connected to the abutment element retention member 128 to form a unit. The control tappet 129 is securely connected to the control cam 30 to form a unit.

The unit including the workpiece abutment element 127 and abutment element retention member 128 and the unit including the control tappet 129 and control cam 130 can be moved between the positions illustrated in FIGS. 10 and 11 along the longitudinal axis 131 of the end portion of the left-hand compressed air conduit 116.

As shown in FIG. 10, the workpiece abutment element 127 protrudes with respect to the stop face 115. In FIG. 11, the front side of the workpiece abutment element 127 is aligned with the stop face 115. The end of the control tappet 129 associated with the workpiece abutment element 127 is movably guided in an axial recess 132 on an abutment element retention member 128. A resilient element in the form of a helical spring 133 surrounds the control tappet 129. One end of the helical spring 133 abuts the control cam 130 and the other end abuts the abutment element retention member 128.

FIG. 10 illustrates the configurations when there is no workpiece 2 in abutment against the workpiece stop 73. The right-hand workpiece sensor 113 is closed, that is to say, compressed air in the right-hand compressed air line 116 cannot be discharged. The control cam 124 is pressed by the compressed air in the compressed air line 116 onto a tapered sealing face 135 on the screw insert 123. Pressure can consequently build up in the right-hand compressed air conduit 116.

The left-hand workpiece sensor 114 is, however, open. The compressed air in the left-hand compressed air conduit 116 can be discharged past the control cam 130, the control tappet 129, and the other components. The control tappet 129 can, for example, have a circular cross-sectional area with a smaller diameter than the inner diameter of the compressed air conduit 116. Alternatively, the control cam 130 can also have a cross-sectional area such that longitudinal edges of the control cam 130 move into abutment against the wall of the compressed air conduit 116 but the compressed air can still be discharged past the control cam 130 by the width across the flats. The control cam 124 and the control tappet 122 of the right-hand workpiece sensor 113 can be sized and shaped similarly to the control cam 130 and the control tappet 129.

According to FIG. 10, no pressure can consequently build up in the left-hand compressed air conduit 116.

FIG. 11 illustrates the configurations of the workpiece sensors 113, 114 when the workpiece 2 is in abutment against the stop faces 115. The workpiece 2 presses the workpiece abutment element 121 of the right-hand workpiece sensor 113 together with the control tappet 122 upwards (relative to the view shown in FIG. 11). The control cam 124 is thereby pressed onto a conical sealing face 136 formed by a wall of the right-hand compressed air conduit 116. The right-hand workpiece sensor 113 is consequently closed and pressure can build up in the right-hand air conduit 116.

The left-hand workpiece sensor 114 is now also closed since the control cam 130 is pressed via the helical spring 133 onto a conical sealing face 137 on a wall of the left-hand compressed air conduit 116. Pressure can consequently also build up in the left-hand compressed air conduit 116.

As shown in FIG. 12, the edge of the workpiece 2 has a slight spacing (e.g., 1 mm) away from the vertical stop faces 115 of the workpiece stop 73. Arrangement of the workpiece edge with a slight spacing from to the stop faces 115 can be advantageous when during the sheet metal processing, the location at which the workpiece retention device 8 clamps the workpiece 2 is modified and the workpiece retention device 8 is moved along the workpiece edge (e.g., the position of the workpiece retention device 8 is reset).

In the event of such a resetting operation, the workpiece 2 is secured at the short sides, for example, by resetting cylinders of the machine tool side and the opened workpiece retention devices 8 are repositioned along the workpiece edge by the workpiece movement unit 5. In order to compensate for measurement inaccuracies of the workpiece edge, the workpiece edge is spaced slightly apart from the fixed stop faces 115 during repositioning for reasons of precaution.

In the configuration illustrated in FIG. 12, the control cam 124 of the right-hand workpiece sensor 113 abuts neither the wall-side sealing face 135 nor the sealing face 136 at the side of the screw insert 123. The right-hand workpiece sensor 113 is therefore open and no pressure can build up at that location.

However, the left-hand workpiece sensor 114 is closed since the control cam 130 of the left-hand workpiece sensor remains in abutment against the wall-side sealing face 137 while the abutment element retention member 128 has been moved downwards in comparison with the configuration illustrated in FIG. 11. This upward abutment is produced by the helical spring 133 arranged between the abutment element retention member 128 and the control cam 130 and which, in the configuration shown in FIG. 12, is tensioned with a resilient force that is greater than the force acting on the control cam 130 via the compressed air in the compressed air line 116.

Using the measuring devices 118, pressure in the compressed air conduits 116 can be determined. The measuring devices can indicate the following four different configurations:

| Left workpiece sensor 114 | Right workpiece sensor 113 | Illustrated in: |
| --- | --- | --- |
| No pressure | Pressure | FIG. 10 |
| Pressure | Pressure | FIG. 11 |
| Pressure | No pressure | FIG. 12 |
| No pressure | No pressure | Not shown |

Based on the first three configurations (e.g., as shown in FIGS. 10-12), the control module 84 can determine the configuration of a workpiece 2 relative to the workpiece stop 73.

The fourth configuration (e.g., no pressure building in either workpiece sensor 113, 114) enables monitoring of the operating position of the workpiece clamping elements 13, 17. Since the compressed air conduits 116 at the transition between the claw spout 18 and the housing 28 are open when the workpiece clamping elements 13, 17 are arranged outside the operating position, it can be verified using the pressure detection whether the workpiece clamping elements 13, 17 are in their operating position. If pressure is unable to build up in both compressed air conduits 116, the work-piece clamping elements 13, 17 are not arranged in the operating position. As a result, the control module 84 can transmit an error message if desired.

For workpiece retention devices having a simplified construction, only one workpiece sensor can be provided for determining pressure that includes a measuring device. The one workpiece sensor can be constructed so that pressure is able to build up in the associated compressed air conduit only when the workpiece 2 abuts the stop faces 115 and the workpiece clamping elements 13, 17 are in their operating position. Typically, the configuration according to FIG. 12 (e.g., no pressure in both workpiece sensors) would consequently not be able to be monitored separately.

Furthermore, other end positions of the movable portions of the workpiece retention device 8 can also be monitored by determining pressure. Furthermore, the securing locations of the workpiece retention device 8, which may form desired breaking locations in the event of a collision, can be pneumatically monitored.

Generally, it is possible to consider different variants of workpiece retention devices 8 that can be constructed with or without a retraction drive 23 and with or without the ability to move in the vertical direction.

A number of embodiments of the invention have been described. Nevertheless, it will be understood that various modifications may be made without departing from the spirit and scope of the invention. Accordingly, other embodiments are within the scope of the following claims.

What is claimed is:

1. A workpiece retention device for securing plate-like workpieces to a workpiece movement unit of a machine tool, the workpiece retention device comprising:
   first and second workpiece clamping elements;
   a pivotably supported redirection device;
   a clamping drive by which the workpiece clamping elements can be moved towards each other starting from an initial relative position in order to clamp a workpiece that is arranged between the workpiece clamping elements, wherein at least one of the first and second workpiece clamping elements can be moved by the clamping drive via the pivotably supported redirection device; and
   an adjustment device comprising an adjustment drive that is disposed between the clamping drive and one the first and the second workpiece clamping elements and that can adjust the initial relative position of the workpiece clamping elements by moving one of the first and the second workpiece clamping elements,
   wherein the adjustment drive of the adjustment device is disposed on the pivotably supported redirection device.

2. The workpiece retention device according to claim 1, wherein the initial relative position of the workpiece clamping elements can be adjusted using the adjustment device in such a manner that the workpiece clamping elements, in the initial relative position, abut the workpiece with a pretensioning force.

3. The workpiece retention device according to claim 1, wherein the initial relative position of the workpiece clamping elements can be adjusted using the adjustment device starting from a maximum opening position of the workpiece clamping elements.

4. The workpiece retention device according to claim 1, wherein an initial pivoting position of the pivotably supported redirection device determines the initial relative position of the workpiece clamping elements and can be adjusted using the adjustment device.

5. The workpiece retention device according to claim 1, wherein the adjustment device comprises a displaceable wedge face.

6. The workpiece retention device according to claim 1, further comprising a retraction drive by which the workpiece clamping elements can be moved between an operating position and a retracted position relative to a housing of the workpiece retention device.

7. The workpiece retention device according to claim 1, wherein the adjustment drive of the adjustment device is constructed as a piston cylinder drive.

8. The workpiece retention device according to claim 7, wherein the piston cylinder drive is a pneumatic piston cylinder drive.

9. The workpiece retention device according to claim 7, wherein the adjustment device comprises a wedge face on a piston of the piston cylinder drive.

10. The workpiece retention device according to claim 1, wherein the workpiece clamping elements are disposed on clamping element retention members that are secured to a piston of a piston cylinder drive of a retraction drive by which the workpiece clamping elements can be moved between an operating position and a retracted position relative to a housing of the workpiece retention device.

11. The workpiece retention device according to claim 1, wherein at least one of the first and second workpiece clamping elements can be moved by the clamping drive via a wedge mechanism.

12. The workpiece retention device according to claim 1, wherein at least one of the first and second workpiece clamping elements can pivot relative to the other of the at least one of the first or second workpiece clamping elements.

13. The workpiece retention device according to claim 1, wherein at least one of the first and second workpiece clamping elements is disposed on a clamping element retention member that can be acted on by a pressure element that is driven by the clamping drive with a frictional or positive-locking connection being produced that at least retards a movement of the workpiece clamping elements from an operating position in the direction of a retracted position.

14. The workpiece retention device according to claim 1, wherein at least one of the first and second workpiece clamping elements is disposed on a clamping element retention member that can be pressed, due to a clamping force produced by the clamping drive, along an actuation axis against at least two inclined surface portions of a guiding face on which the clamping element retention member can move along a retraction axis in order to be transferred into a retracted position, the surface portions being spaced apart from each other in a direction that is substantially perpendicular to the actuation axis and the retraction axis.

15. The workpiece retention device according to claim 1, wherein the adjustment device comprises a wedge face that is provided on an adjustment component that can be pressed by a drive element of the clamping drive along an actuation axis against at least two inclined surface portions of a guiding face on which the adjustment component can move along an adjustment axis in order to change the initial relative position of the workpiece clamping elements, the inclined surface portions being spaced-apart from each other in a direction that is substantially perpendicular to the actuation axis and in a direction that is substantially perpendicular to the adjustment axis.

16. The workpiece retention device according to claim 1, wherein the adjustment drive of the adjustment device comprises an operating medium system that has an outlet opening which is closed when the workpiece clamping elements are arranged in an operating position and which is open when the workpiece clamping elements are not arranged in the operating position.

17. The workpiece retention device according to claim 1, further comprising a retraction drive by which the workpiece clamping elements can be moved between an operating position and a retracted position relative to a housing of the workpiece retention device, the retraction device comprising an operating medium system that has an outlet opening which is closed when the adjustment drive is arranged so that the workpiece clamping elements have maximum spacing relative to one another, and which is open when the workpiece clamping elements do not have a maximum spacing relative to one another.

18. The workpiece retention device according to claim 1, further comprising a control device by which an operating medium is supplied to an operating cylinder of a piston cylinder drive of the clamping drive based on an operating pressure in the operating cylinder of a piston cylinder drive of the adjustment drive.

19. The workpiece retention device according to claim 1, further comprising a workpiece stop having at least one workpiece sensor to detect a workpiece.

20. The workpiece retention device according to claim 19, wherein the at least one workpiece sensor comprises at least one pneumatic workpiece sensor.

21. The workpiece retention device according to claim 1, wherein the clamping drive is constructed as a piston cylinder drive.

22. The workpiece retention device according to claim 21, wherein the piston cylinder drive is a pneumatic piston cylinder drive.

23. The workpiece retention device according to claim 6, wherein the retraction drive is constructed as a piston cylinder drive.

24. The workpiece retention device according to claim 23, wherein the piston cylinder drive is a pneumatic piston cylinder drive.

\* \* \* \* \*

UNITED STATES PATENT AND TRADEMARK OFFICE
CERTIFICATE OF CORRECTION

| | | |
|---|---|---|
| PATENT NO. | : 9,156,115 B2 | Page 1 of 1 |
| APPLICATION NO. | : 13/329726 | |
| DATED | : October 13, 2015 | |
| INVENTOR(S) | : Christoph Schmidt | |

It is certified that error appears in the above-identified patent and that said Letters Patent is hereby corrected as shown below:

In the claims
At column 17, line 28, in Claim 1, after "one" insert --of--.

Signed and Sealed this
Ninth Day of August, 2016

Michelle K. Lee
*Director of the United States Patent and Trademark Office*